(12) United States Patent
Crooks et al.

(10) Patent No.: US 11,430,096 B2
(45) Date of Patent: Aug. 30, 2022

(54) DETECTING AND PREVENTING RECEIPT PRINTER JAMS

(71) Applicant: NCR Corporation, Atlanta, GA (US)

(72) Inventors: John Crooks, Duluth, GA (US); Michael Lee Barlow, Duluth, GA (US); Andrew Klenzak, Atlanta, GA (US); Brian Patrick Rogers, Roswell, GA (US); Sergio Silva, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 335 days.

(21) Appl. No.: 16/845,755

(22) Filed: Apr. 10, 2020

(65) Prior Publication Data

US 2021/0319631 A1     Oct. 14, 2021

(51) Int. Cl.
*G06T 5/50*     (2006.01)
*G07B 5/04*     (2006.01)
*G07B 5/08*     (2006.01)
*G06T 7/00*     (2017.01)

(52) U.S. Cl.
CPC .............. *G06T 5/50* (2013.01); *G07B 5/04* (2013.01); *G06T 7/001* (2013.01); *G06T 2207/30124* (2013.01); *G07B 5/08* (2013.01)

(58) Field of Classification Search
CPC ........... G06K 9/00261; G06K 9/00288; G06K 9/00228; G06K 9/00268; G06K 9/00281; G06K 9/6202; G06K 2009/4666; G06K 9/00362; G06K 9/4642; G06K 9/6206; G06K 9/6255; G06K 9/6256; G06K 9/00275; G06K 9/00308; G06K 9/00926; G06K 9/3233; G06K 9/4671; G06K 9/6215; G06K 9/6228; G06K 9/6262; G06K 9/627; G06K 9/6276; G06K 9/629; G06N 3/0454; G06N 3/084; G06N 3/08; G06T 11/00; G06T 2207/10016; G06T 2207/10024; G06T 2207/20081; G06T 2207/30201; G06T 2207/30241; G06T 2207/30244; G06T 7/251; G06T 7/74; G06T 7/80

See application file for complete search history.

(56) References Cited

U.S. PATENT DOCUMENTS

| | | | |
|---|---|---|---|
| 2013/0136518 A1* | 5/2013 | Wang | B41J 11/006 400/74 |
| 2017/0358103 A1* | 12/2017 | Shao | H04N 5/23254 |
| 2019/0263161 A1* | 8/2019 | Gotanda | G07G 1/0018 |
| 2020/0035070 A1* | 1/2020 | Ogawa | G07G 1/0018 |

* cited by examiner

*Primary Examiner* — Quan M Hua
(74) *Attorney, Agent, or Firm* — Schwegman, Lundberg & Woessner

(57) ABSTRACT

Disclosed are systems and methods for detecting a printer jam. The systems and methods can include receiving a reference image of a printer opening and a second image of the printer opening. A lack of a receipt between the second image compared to the reference image can be detected. The lack of the receipt can indicate the printer jam. After detecting the printer jam, operation of the self-service terminal can be terminated.

20 Claims, 3 Drawing Sheets

DETECTING AND PREVENTING RECEIPT PRINTER JAMS

SUMMARY

Disclosed are systems and methods for detecting a printer jam. The systems and methods can include receiving a reference image of a printer opening and a second image of the printer opening. A lack of a receipt between the second image compared to the reference image can be detected. The lack of the receipt can indicate the printer jam. After detecting the printer jam, operation of the self-service terminal can be terminated.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

Corresponding reference characters indicate corresponding parts throughout the several views. The exemplifications set out herein illustrate exemplary embodiments of the disclosure, and such exemplifications are not to be construed as limiting the scope of the disclosure any manner.

DETAILED DESCRIPTION

Retail printers can jam, which can damage printers and annoy customers. As disclosed herein, one or more cameras can be used to monitor the printer. The systems and methods disclosed herein can use a data fusion of camera and printer information to detect and avoid printer jams, abandoned receipts, and improperly loaded printer paper.

Printers used for self-service terminals, sometimes referred to as retail printers, can jam. In addition, customers sometimes abandon their receipts by not taking printed receipts from the printer. Either of these events can lead to unhappy customers, paper waste, and printer jams. Also, store attendants sometimes load rolls of thermal paper upside-down, leading to unhappy customers when a blank receipt prints.

Printer jams can physically damage the printer. For example, a presenter is an extended paper path attached to the printer that holds the receipt out of reach of the customer until it is finished printing. This prevents the customer from pulling on the paper while the receipt is still printing, because such pulling can damage the printer mechanism. If the paper jams inside the presenter and starts to fanfold back into the printer, the paper can bend the metal of the printer mechanism. This bending can lead to further, more frequent, printer jams because the paper is not being properly guided through the printer mechanism.

As disclosed herein, printers can have built-in sensors to detect a jam. However, the built-in sensors may be limited and cannot detect all jams. For example, in self-checkout configurations with printer presenter, if the previous customer does not remove their receipt, the abandoned receipt can block the presenter sensor from detecting subsequent jams.

As disclosed herein, one or more cameras can be used with image processing to monitor the printer output slot and customer area. Using a data fusion of camera and printer information, the systems and methods disclosed herein can detect jams by ensuring the paper comes out of the printer slot when expected. The systems and methods can also detect when the current customer is pulling on their receipt before printing is complete and when a customer abandons his or her receipt. The cameras can also be used to detect thermal paper installed upside down and to avoid printing a receipt when the customer walks away.

As disclosed herein, reference images can be used in conjunction with images captured by the cameras to detect printer jams, receipt paper installed upside down, and when a customer walks away before a receipt is printed. The systems and methods disclosed herein can use image subtraction and/or other image analysis techniques to determine if printer paper is ejected from the printer. When the paper does not eject from the printer, then the systems and methods disclosed herein can terminate operations of the self-service terminal and activate a light or other alarm to indicate the error.

Figure 1:
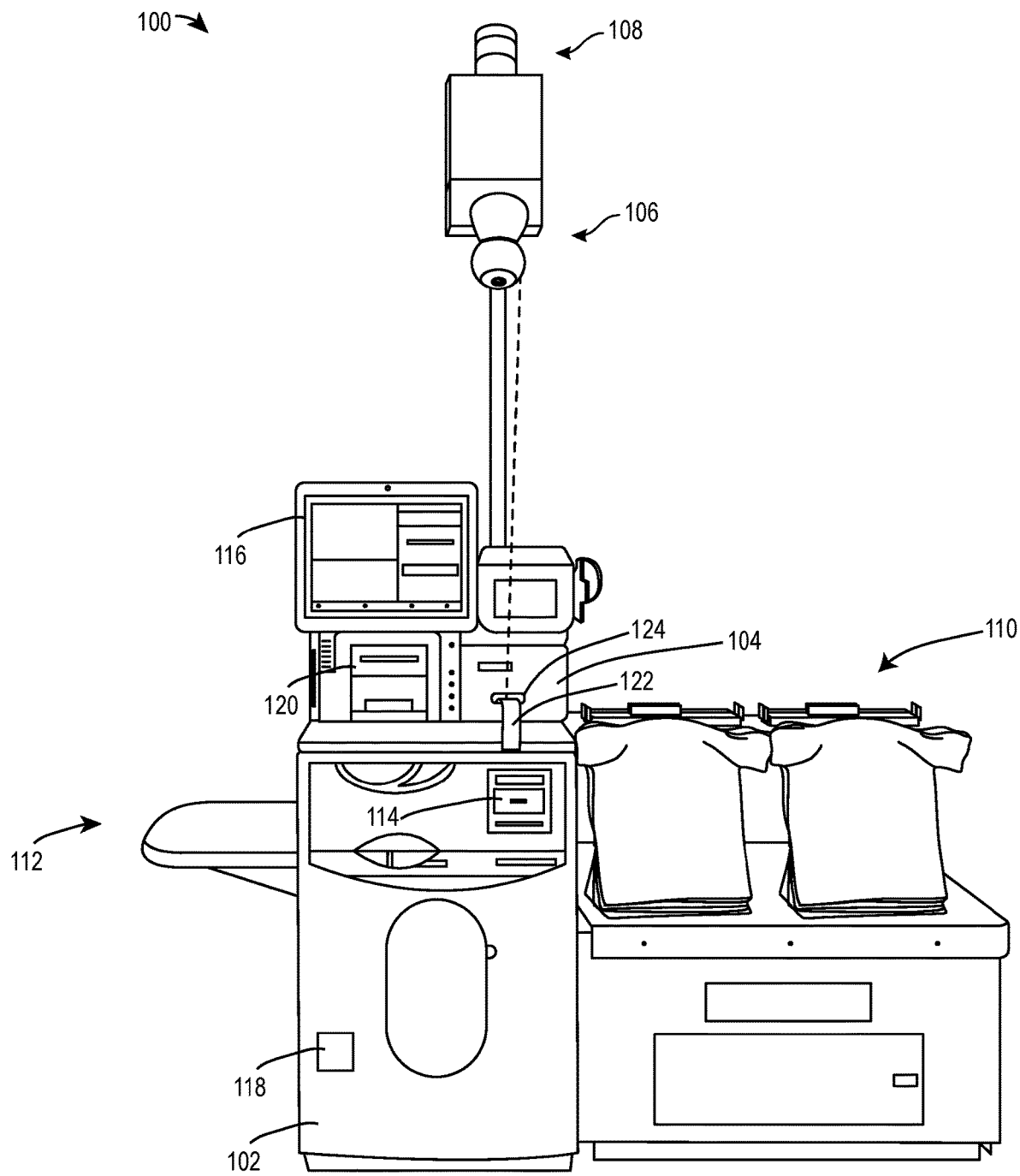
FIG. 1 shows an example self-service terminal consistent with this disclosure.

Turning now to the figures, FIG. 1 shows an example self-service terminal 100 consistent with this disclosure. Self-service terminal 100 can include cabinet 102, a printer 104, a camera 106, a light 108, a bagging area 110, a staging area 112, a bill accepter 114, a display 116, a controller 118, and a scanner 120. Bill accepter 114, display 116, scanner 120, printer 104, light 108, and camera 106 can be electrically coupled to and controlled by controller 118. During use, a customer can use display 116 as an input/output (I/O) device as well as a user interface. As part of a transaction, the customer can pass items from staging area 112 across scanner 120 and into bagging area 110. As part of the transaction printer 104 can print a receipt 122, which can pass through a printer opening 124.

Figure 2:
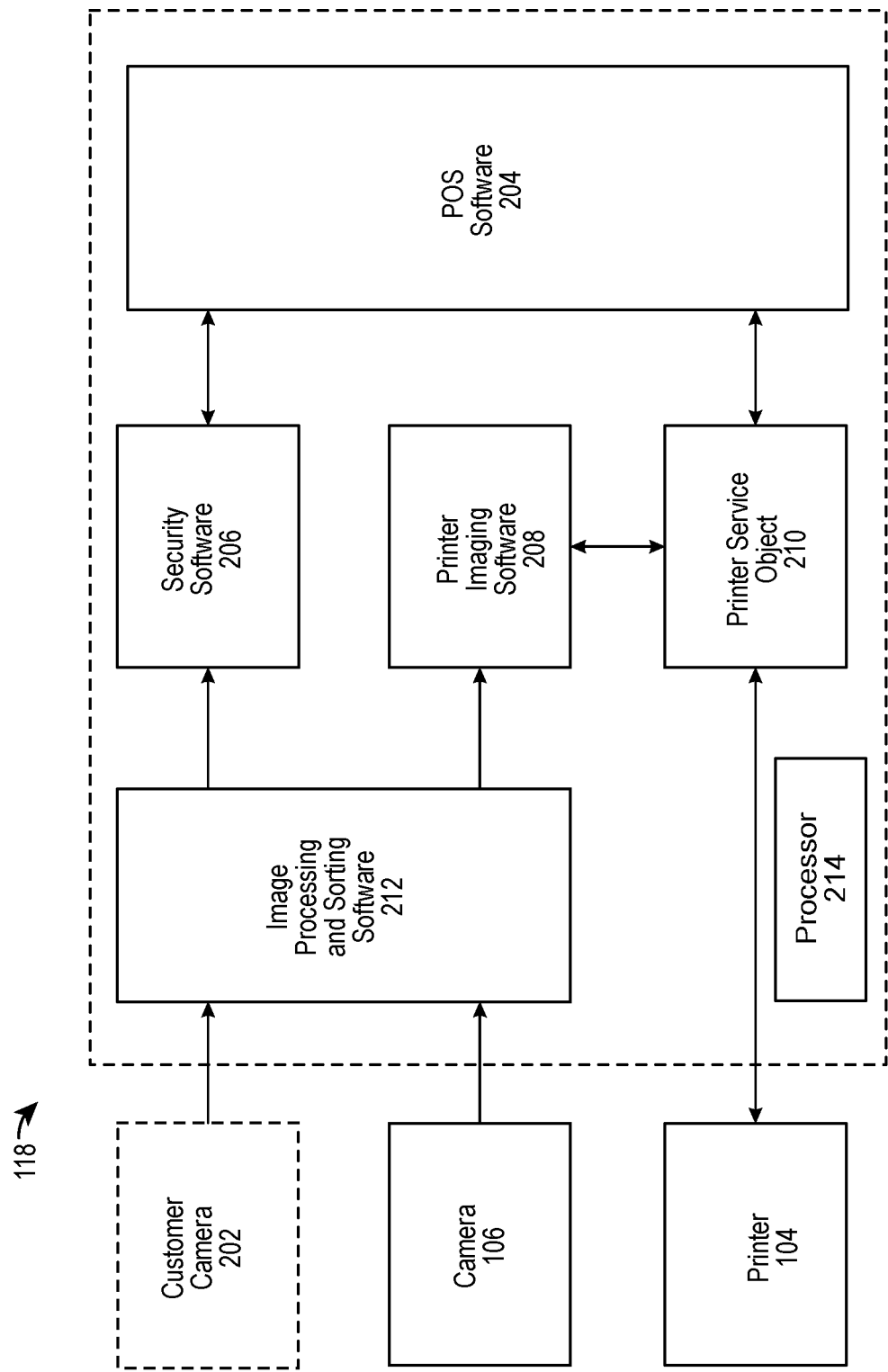
FIG. 2 shows a schematic of a controller consistent with this disclosure.

FIG. 2 shows a schematic of controller 118 consistent with this disclosure. As shown in FIG. 2, controller 118 can be connected to printer 104, camera 106, and optionally, a customer camera 202. Customer camera 202 can be located within a store and arranged to capture images of the customer or an area where the customer is expected to be during a transaction.

Controller 118 can include point-of-sale (POS) software 204, security software 206, printer imaging software 208, a printer service object 210, and image processing and sorting software 212. A processor 214 can be used to execute point-of-sale (POS) software 204, security software 206, printer imaging software 208, printer service object 210, and image processing and sorting software 212.

As shown in FIG. 1, camera 106 can be arranged to view printer opening 124 and general surrounding area of self-service terminal 100. Customer camera 202 can also be arranged to view the general surrounding area of self-service terminal 100 as well. Camera 106 and/or customer camera 202 can be connected to controller 118 for processing the camera images. Camera 106 and customer camera 202 can also be connected to scanner 120 for image processing. Camera 106 and customer camera 202 can also have their own built-in processing units to process images they capture. As such, image processing and sorting software 212 can be stored in memory of camera 106 and/or customer camera 202.

As disclosed herein, camera 106 and/or customer camera 202 can be cameras that are part of self-service terminal 100 that are used for other applications. For example, self-service terminal 100 can have camera-based imaging scanners for scanning barcodes and recognizing produce with software such as Picklist Reduction produced by NCR of Atlanta, Georgia. While FIG. 1 shows camera 106 attached to a pole, such as a tri-light pole, or other structure of self-service terminal 100, camera 106 and/or customer camera 202 can be ceiling-mounted cameras for theft detection systems like StopLift and Produce Assurance produced by NCR of Atlanta, Georgia. As such one or more of these existing cameras can serve a dual purpose to provide both security and printer monitoring.

As disclosed herein, camera 106 can be used to monitor printer opening 124, in addition to any areas of interest. For example, images captured by camera 106 can be passed to security software 206. Customer camera 202 can also monitor the area where the customer stands, in addition to any areas of interest and those images can be transferred to security software 206 for processing.

Image processing and sorting software 212 can pre-process images received from cameras 106 and 202, sort the images, and distributes the images to security software 206 and printer imaging software 208. Security software 206 can perform image processing for security purposes such as using StopLift, Produce Assurance, and/or Picklist Reduction distributed by NCR of Atlanta, Georgia.

Printer imaging software 208 can perform image processing for printer jam prevention and related features as disclosed herein. POS software 204 can talk to the printer service object 210 to print receipts via printer 104 and to receive events from printer imaging software 208.

As disclosed herein, printer jams can be detected by monitoring printer opening 124 whenever printer service object 210 prints a receipt. If the receipt fails to emerge from printer opening 124 as expected, printer imaging software 208 can transmit a signal to printer service object 210 to stop printing the receipt and to report a jam to POS software 204.

If the receipt shows up as expected but printer imaging software 208 does not detect black printing on the receipt, printer imaging software 208 can transmit a signal to printer service object 210 to report a paper misload (i.e., the paper is loaded upside down and/or backwards) to POS software 204.

If printer imaging software 208 detects that the customer has not taken his or her receipt after a fixed timeout using camera 106, or if printer imaging software 208 detects that the customer has walked away using customer camera 202, it can transmit a signal to printer service object 210 to report an abandoned receipt to POS software 204, and POS software 204 can alert the customer to take his or her receipt or alert an attendant to remove the receipt and dispose of it. POS software 204 can also print the receipt with a partial paper cut that holds the receipt in printer opening 124. If the customer abandons the receipt, then POS software 204 can perform a subsequent full paper cut, which allows the receipt to fall to the floor.

POS software 204 can also cause a receipt to not be printed based on a customer's past interactions. For example, using loyalty rewards information and/or credit card information, self-service terminal 100 can retrieve a user profile. The user profile can include data, such as images, from past transactions that indicate the customer generally does not retrieve his or her receipt. Based on the data, self-service terminal 100 can transmit a signal to printer service object 210 to not print the receipt.

If printer imaging software 208, using customer camera 202, detects that the customer has walked away before the receipt has been printed, then printer imaging software 208 can transmit a signal to printer service object 210 that instructs POS software 204 to cancel printing of the receipt.

If printer imaging software 208 detects that the customer is pulling on the receipt with their hand while the receipt is still printing, the printer imaging software 208 can transmit a signal to printer service object 210 to report this to POS software 204. Upon receiving the signal, POS software 204 can alert the customer to stop pulling. For example, self-service terminal can audibly sound and/or display on display 116 a message such as, "Please wait for your receipt to finish printing before removing it."

Should a printer jam be detected, printer imaging software 208 can store a short video of the jam for later diagnosis by the self-checkout station attendant or a field engineer.

Figure 3:
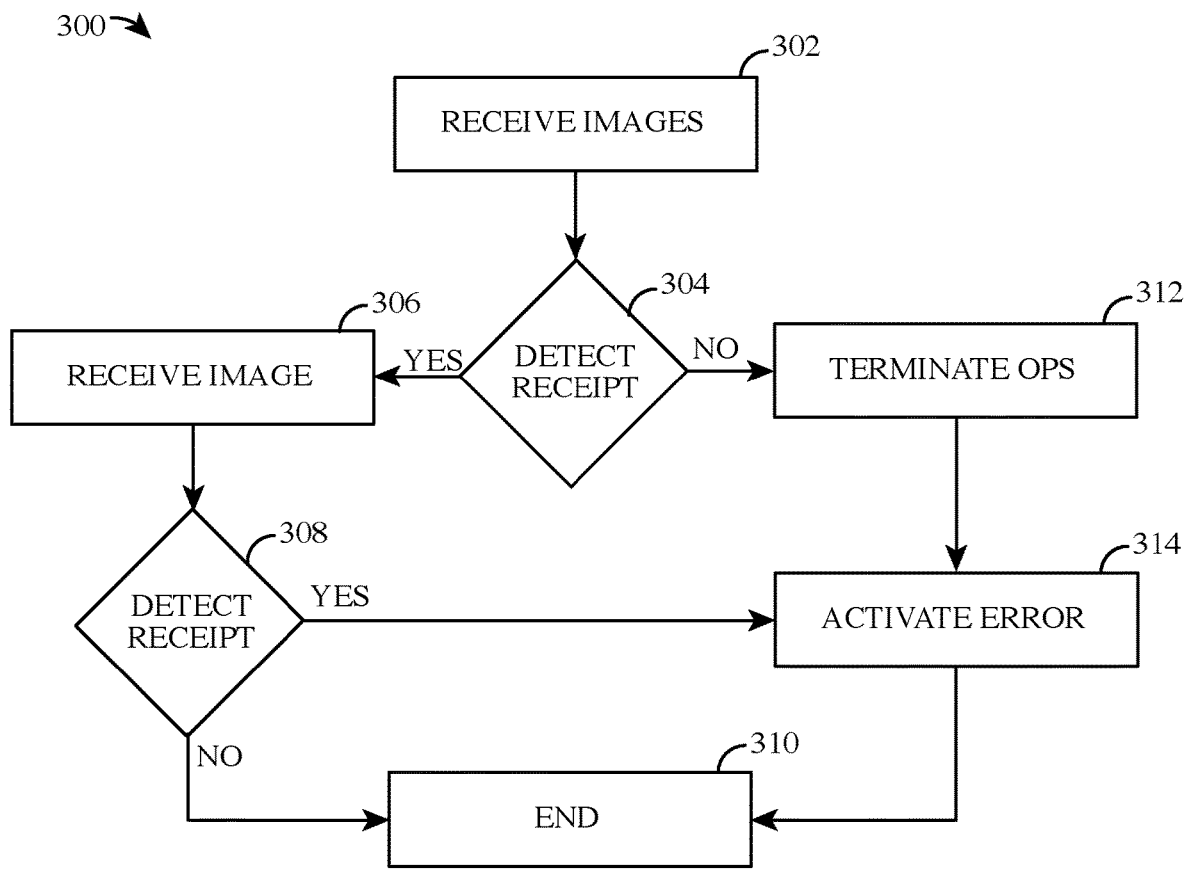
FIG. 3 shows an example method consistent with this disclosure.

FIG. 3 shows an example method 300 consistent with this disclosure. Method 300 can begin at stage 302 where images can be received. The images received can include a reference image that was taken of printer opening 124 when a receipt is not present. The reference image can be captured upon start up of self-service terminal 100 via camera 106. Upon completion of a transaction, a second image can be captured of printer opening 124.

After capturing the reference image and the second image method 300 can proceed to decision block 304 where the lack of a receipt can be detected. To detect a lack of a receipt image analysis can be performed using the reference image and the second image. Examples of image analysis can include image subtraction, pixel comparing, etc. as disclosed herein.

Figure 4:
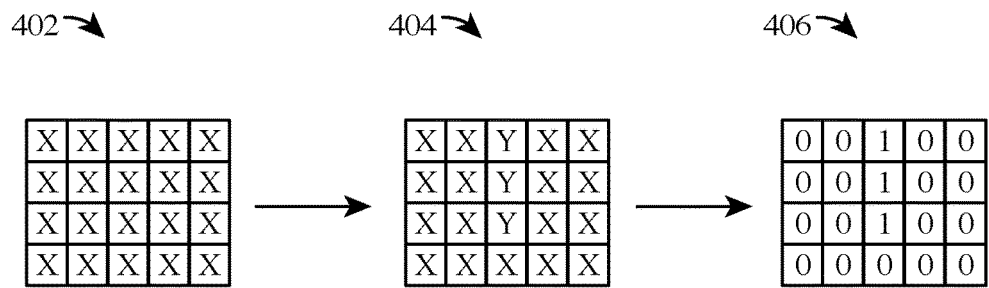
FIG. 4 shows an example image consistent with this disclosure.

FIG. 4 shows and example of the image analysis. As shown in FIG. 4, reference image 402 can include a number of pixels that have a value. For simplicity the value for each pixel is shown as "X." However, the value for each pixel can be different for each pixel. Second image 404 can include a number of pixels that have a value. When a receipt is not present (i.e., there is a printer jam), the pixel values should be the same as those of reference image. As shown in FIG. 4, some of the pixels of second image 404 can have a value "Y." The value "Y" can indicate that there is a white piece of paper where a black or other color for the surfaces proximate printer opening 124.

To detect the presence, or lack thereof, of the receipt, the pixel values can be subtracted. The resulting of the subtraction can be seen in composite image 406. For the values were the receipt is not present, the subtraction can result in composite image 406 have a value of 0. In other words, because the portions where the receipt is not located are the same for reference image 402 and second image 404, subtraction of the pixel values results in "X" minus "X," or 0.

Instead of, or in addition, to subtraction a logical operation or comparison can be performed as part of the image analysis. For example, example, the value of each pixel can be compared and where the values are the same a 0, or true value, can be returned. Where the pixel values are different a 1, of false value, can be returned. In either instance, the zero value for the pixel can indicated that the receipt is not present. Any value other than zero, i.e., a non-zero value, can indicate the receipt is present.

Other examples of image analysis can include object tracking by looking for and tracking motion of the printer paper as it first exits printer opening 124. In addition, an object character recognition (OCR) operation can be performed to look for text on the printer paper.

If the receipt is detected method 300 can proceed to stage 306 where a third image can be received. The third image can be received after a predetermined time after the transaction is complete. From stage 306, method 300 can proceed to decision block 308 where a determination can be made as to whether the receipt is present. If the receipt is present the customer failed to take the receipt. Detecting the presence of the receipt at decision block 308 is the same as at decision block 304. If the receipt is not present the customer took the receipt and method 300 can terminate at stage 310.

If the receipt is not detected at decision block 304, method 300 can proceed to stage 312 where operation of self-service terminal 100 can be terminated. Termination of the operations of self-service terminal 100 can prevent damage to printer 104 as disclosed herein. From stage 312, method 300 can proceed to stage 314 where an error light can be activated to let an attendant know there is a printer jam. If the receipt is detected in decision block 308 (i.e., the customer abandoned the receipt), method 300 can proceed to stage 314 as well to alert the attendant, who can then retrieve and discard the receipt. From stage 314 method 300 can terminate at stage 310.

The stages of method 300 have been described in a particular order for simplicity. The stages can be rearranged and/or omitted without departing from the scope of this disclosure. For example, stage 312 can be omitted and only the error indicator activated in stage 314.

Examples and Notes

The following, non-limiting examples, detail certain aspects of the present subject matter to solve the challenges and provide the benefits discussed herein, among others.

Example 1 is a method for detecting a printer jam, the method comprising: receiving, at a self-service terminal, a reference image of a printer opening; receiving, at the self-service terminal, a second image of the printer opening; detecting, by the self-service terminal, a lack of a receipt between the second image compared to the reference image, the lack of the receipt indicating the printer jam; and terminating, by the self-service terminal, operation of the self-service terminal upon detecting the lack of the receipt.

In Example 2, the subject matter of Example 1 optionally includes wherein detecting the lack of the receipt includes performing image subtracting using the second image and the reference image.

In Example 3, the subject matter of Example 2 optionally includes wherein the lack of the receipt includes the presence of non-zero values for pixels of the second image after subtracting the reference image from the second image.

In Example 4, the subject matter of any one or more of Examples 1-3 optionally include wherein detecting the lack of the receipt includes performing image analysis using the second image and the reference image.

In Example 5, the subject matter of any one or more of Examples 1-4 optionally include wherein receiving the second image includes capturing the second image using a camera of the self-service terminal.

In Example 6, the subject matter of any one or more of Examples 1-5 optionally include wherein receiving the second image includes receiving the second image from a remote camera.

In Example 7, the subject matter of any one or more of Examples 1-6 optionally include activating, by the self-service terminal, an error indicator of the self-service terminal in response to detecting the lack of the receipt.

In Example 8, the subject matter of any one or more of Examples 1-7 optionally include receiving a third image of the printer opening; and detecting an abandoned receipt using the reference image and the third image of the printer opening.

Example 9 is a system for detecting a printer jam, the system comprising: a processor; and a memory storing instructions that, when executed by the processor, causes the processor to: receive a reference image of a printer opening, receive a second image of the printer opening, detect a lack of a receipt between the second image compared to the reference image, the lack of the receipt indicating the printer jam, and terminate operation of a self-service terminal upon detecting the lack of the receipt.

In Example 10, the subject matter of Example 9 optionally includes wherein the instructions that cause the processor to detect the lack of the receipt include additional instruction that cause the processor to perform image subtracting using the second image and the reference image.

In Example 11, the subject matter of Example 10 optionally includes wherein the lack of the receipt includes the presence of non-zero values for pixels of the second image after subtracting the reference image from the second image.

In Example 12, the subject matter of any one or more of Examples 9-11 optionally include wherein the instructions that cause the processor to detect the lack of the receipt include additional instruction that cause the processor to perform image analysis using the second image and the reference image.

In Example 13, the subject matter of any one or more of Examples 9-12 optionally include wherein the instructions that cause the processor to receive the second image include additional instruction that cause the processor to capture the second image using a camera of the self-service terminal.

In Example 14, the subject matter of any one or more of Examples 9-13 optionally include wherein the instructions that cause the processor to receive the second image include additional instruction that cause the processor to receive the second image from a remote camera.

In Example 15, the subject matter of any one or more of Examples 9-14 optionally include additional instructions that cause the processor to activate an error indicator of the self-service terminal in response to the lack of the receipt being detected.

In Example 16, the subject matter of any one or more of Examples 9-15 optionally include additional instructions that cause the processor to: receive a third image of the printer opening; and detect an abandoned receipt using the reference image and the third image of the printer opening.

Example 17 is a self-service terminal comprising: a printer including a printer opening sized to allow a receipt to pass from an interior of the printer through the printer opening; a camera arranged to capture images of the printer opening; a controller operative to: cause the camera to capture a reference image of the printer opening, cause the printer to print the receipt, cause the camera to capture a second image of the printer opening, perform image subtraction using the second image and the reference image to detect the presence or absence of the receipt, terminate operation of a self-service terminal upon an absence of the receipt, and activate an error indicator of the self-service terminal in response to the absence of the receipt being detected.

In Example 18, the subject matter of Example 17 optionally includes wherein the presence of the receipt is detected when pixels of the second image include non-zero values after subtracting the reference image from the second image.

In Example 19, the subject matter of any one or more of Examples 17-18 optionally include wherein the absence of the receipt is detected when pixels of the second image are zero values after subtracting the reference image from the second image.

In Example 20, the subject matter of any one or more of Examples 9-19 optionally include additional instructions that cause the processor to: receive a second image of the printer opening; and detect an abandoned receipt using the reference image and the second image of the printer opening.

In Example 21, the systems, self-service terminals, or method of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for detecting a printer jam, the method comprising:
    receiving, at a self-service terminal, a reference image of a printer opening;
    receiving, at the self-service terminal, a second image of the printer opening;
    detecting, by the self-service terminal, a lack of a receipt between the second image compared to the reference image, the lack of the receipt indicating the printer jam; and
    terminating, by the self-service terminal, operation of the self-service terminal upon detecting the lack of the receipt.

2. The method of claim 1, wherein detecting the lack of the receipt includes performing image subtracting using the second image and the reference image.

3. The method of claim 2, wherein the lack of the receipt includes the presence of non-zero values for pixels of the second image after subtracting the reference image from the second image.

4. The method of claim 1, wherein detecting the lack of the receipt includes performing image analysis using the second image and the reference image.

5. The method of claim 1, wherein receiving the second image includes capturing the second image using a camera of the self-service terminal.

6. The method of claim 1, wherein receiving the second image includes receiving the second image from a remote camera.

7. The method of claim 1, further comprising activating, by the self-service terminal, an error indicator of the self-service terminal in response to detecting the lack of the receipt.

8. The method of claim 1, further comprising:
    receiving a third image of the printer opening; and
    detecting an abandoned receipt using the reference image and the third image of the printer opening.

9. A system for detecting a printer jam, the system comprising:
    a processor; and
    a memory storing instructions that, when executed by the processor, causes the processor to:
        receive a reference image of a printer opening,
        receive a second image of the printer opening,
        detect a lack of a receipt between the second image compared to the reference image, the lack of the receipt indicating the printer jam, and
        terminate operation of a self-service terminal upon detecting the lack of the receipt.

10. The system of claim 9, wherein the instructions that cause the processor to detect the lack of the receipt include additional instruction that cause the processor to perform image subtracting using the second image and the reference image.

11. The system of claim 10, wherein the lack of the receipt includes the presence of non-zero values for pixels of the second image after subtracting the reference image from the second image.

12. The system of claim 9, wherein the instructions that cause the processor to detect the lack of the receipt include additional instruction that cause the processor to perform image analysis using the second image and the reference image.

13. The system of claim 9, wherein the instructions that cause the processor to receive the second image include additional instruction that cause the processor to capture the second image using a camera of the self-service terminal.

14. The system of claim 9, wherein the instructions that cause the processor to receive the second image include additional instruction that cause the processor to receive the second image from a remote camera.

15. The system of claim 9, further comprising additional instructions that cause the processor to activate an error indicator of the self-service terminal in response to the lack of the receipt being detected.

16. The system of claim 9, further comprising additional instructions that cause the processor to:
  receive a third image of the printer opening; and
  detect an abandoned receipt using the reference image and the third image of the printer opening.

17. A self-service terminal comprising:
  a printer including a printer opening sized to allow a receipt to pass from an interior of the printer through the printer opening;
  a camera arranged to capture images of the printer opening;
  a controller operative to:
    cause the camera to capture a reference image of the printer opening,
    cause the printer to print the receipt,
    cause the camera to capture a second image of the printer opening,
    perform image subtraction using the second image and the reference image to detect the presence or absence of the receipt,
    terminate operation of a self-service terminal upon an absence of the receipt, and
    activate an error indicator of the self-service terminal in response to the absence of the receipt being detected.

18. The self-service terminal of claim 17, wherein the presence of the receipt is detected when pixels of the second image include non-zero values after subtracting the reference image from the second image.

19. The self-service terminal of claim 17, wherein the absence of the receipt is detected when pixels of the second image are zero values after subtracting the reference image from the second image.

20. The system of claim 9, further comprising additional instructions that cause the processor to:
  receive a second image of the printer opening; and
  detect an abandoned receipt using the reference image and the second image of the printer opening.

* * * * *